US010147442B1

(12) United States Patent
Panchapagesan et al.

(10) Patent No.: US 10,147,442 B1
(45) Date of Patent: Dec. 4, 2018

(54) ROBUST NEURAL NETWORK ACOUSTIC MODEL WITH SIDE TASK PREDICTION OF REFERENCE SIGNALS

(71) Applicant: Amazon Technologies, Inc., Seattle, WA (US)

(72) Inventors: Sankaran Panchapagesan, Mountain View, CA (US); Shiva Kumar Sundaram, Mountain View, CA (US); Arindam Mandal, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 14/869,803

(22) Filed: Sep. 29, 2015

(51) Int. Cl.
*G10L 25/30* (2013.01)
*G10L 15/02* (2006.01)
*G10L 15/06* (2013.01)
*G10L 25/12* (2013.01)
*G10L 15/20* (2006.01)

(52) U.S. Cl.
CPC .............. *G10L 25/30* (2013.01); *G10L 15/02* (2013.01); *G10L 15/063* (2013.01); *G10L 15/20* (2013.01); *G10L 25/12* (2013.01)

(58) Field of Classification Search
CPC ....... G10L 15/16; G10L 15/063; G10L 15/08; G10L 15/02; G10L 15/142; G10L 2015/025; G10L 15/20; G10L 17/14; G10L 17/18; G10L 21/0272; G10L 25/30; G10L 25/78
See application file for complete search history.

(56) References Cited

U.S. PATENT DOCUMENTS 6,026,358 A * 2/2000 Tomabechi ............ G06N 3/049
 704/232
9,460,711 B1 * 10/2016 Vanhoucke ............. G10L 15/16
2008/0208581 A1 * 8/2008 Pelecanos ............... G10L 17/04
 704/250

(Continued)

OTHER PUBLICATIONS

Seltzer, Michael L., Dong Yu, and Yongqiang Wang. "An investigation of deep neural networks for noise robust speech recognition." In 2013 IEEE International Conference on Acoustics, Speech and Signal Processing, pp. 7398-7402. IEEE, 2013.*

(Continued)

*Primary Examiner* — Douglas Godbold
*Assistant Examiner* — Mark Villena
(74) *Attorney, Agent, or Firm* — Knobbe, Martens, Olson & Bear, LLP

(57) ABSTRACT

A neural network acoustic model is trained to be robust and produce accurate output when used to process speech signals having acoustic interference. The neural network acoustic model can be trained using a source-separation process by which, in addition to producing the main acoustic model output for a given input, the neural network generates predictions of the separate speech and interference portions of the input. The parameters of the neural network can be adjusted to jointly optimize all three outputs (e.g., the main acoustic model output, the speech signal prediction, and the interference signal prediction), rather than only optimizing the main acoustic model output. Once trained, output layers for the speech and interference signal predictions can be removed from the neural network or otherwise disabled.

20 Claims, 6 Drawing Sheets

(56) References Cited

U.S. PATENT DOCUMENTS

| | | | |
|---|---|---|---|
| 2009/0119103 A1* | 5/2009 | Gerl | G10L 17/04 704/243 |
| 2013/0158999 A1* | 6/2013 | Maruta | G01C 21/3608 704/252 |
| 2013/0211829 A1* | 8/2013 | Principe | G10L 21/0264 704/226 |
| 2015/0066499 A1* | 3/2015 | Wang | G10L 25/30 704/233 |
| 2015/0161988 A1* | 6/2015 | Dognin | G10L 15/063 704/232 |
| 2016/0098987 A1* | 4/2016 | Stolcke | G10L 15/063 704/232 |
| 2016/0140956 A1* | 5/2016 | Yu | G10L 15/16 704/240 |
| 2016/0171974 A1* | 6/2016 | Hannun | G10L 15/063 704/232 |
| 2016/0189730 A1* | 6/2016 | Du | G10L 21/0272 704/233 |
| 2016/0260428 A1* | 9/2016 | Matsuda | G06N 3/08 |
| 2016/0379665 A1* | 12/2016 | Kurata | G10L 25/30 704/232 |

OTHER PUBLICATIONS

Chen, Guoguo, Carolina Parada, and Georg Heigold. "Small-footprint keyword spotting using deep neural networks." In 2014 IEEE International Conference on Acoustics, Speech and Signal Processing (ICASSP), pp. 4087-4091. IEEE, 2014.*

Chen, S., and S. A. Billings. "Neural networks for nonlinear dynamic system modelling and identification." International journal of control 56, No. 2 (1992): 319-346.*

* cited by examiner

ROBUST NEURAL NETWORK ACOUSTIC MODEL WITH SIDE TASK PREDICTION OF REFERENCE SIGNALS

BACKGROUND

Automatic speech recognition ("ASR") systems may utilize various models to recognize speech. For example, acoustic models are used to determine the likelihood that a portion of an utterance captured in an audio signal includes a given word or subword unit (e.g., a phoneme). Many acoustic models are based on artificial neural networks, such as deep neural networks, that have a large number of parameters (e.g., millions, tens of millions, etc.). The parameters of neural network acoustic models can be set in a process referred to as training. Models can be trained using training data that includes input data and the correct or preferred output of the model for the corresponding input data. The model can be used to process the input data and generate output. Based on any difference between the generated output and the correct output, the parameters of the model can be modified so that the model is more likely to produce the correct output. In order to improve the accuracy of the model when used to process utterances captured in noisy conditions, the model can be trained using training data generated for, or collected in, a variety of different noisy conditions.

One method of training neural network acoustic models is the gradient descent technique. In gradient descent, a modification to each parameter of a model made is based on the error in the output produced by the model, as determined using a "loss" function or "objective" function. A derivative, or "gradient," of the loss function can be computed and used to determine the magnitude and direction in which each individual parameter of the model is to be adjusted in order to produce output that is closer to the correct or preferred output for a given input. In stochastic gradient descent, the gradient is computed and applied for a single training input at a time, or aggregated from a small number of training inputs, rather than the entire set of training data. Therefore, the gradient may be referred to as a "partial gradient" because it is not based on the entire corpus of training data. Instead, it is based on the error that occurs when processing only a particular subset of the training data. Subsets or "mini-batches" of training data can be processed iteratively and the model parameters can be iteratively updated until the output converges on the correct or preferred output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
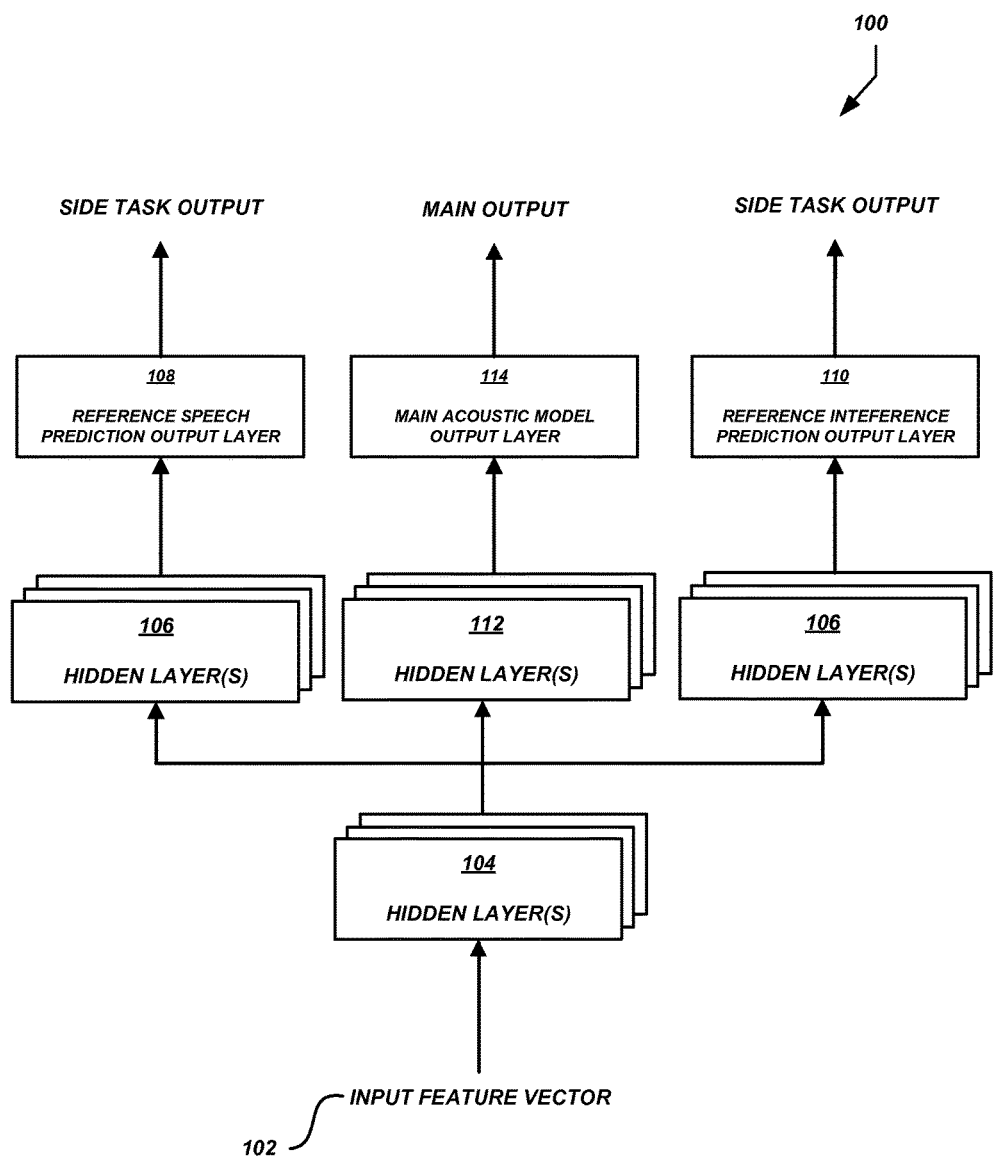
FIG. 1 is a diagram of an illustrative neural network acoustic model configured to produce main acoustic model output and also side task outputs for use in training the model.

The present disclosure is directed to a neural network acoustic model trained to be robust and produce accurate output when used to process speech signals having acoustic interference. Generally described, neural networks, including but not limited to deep neural networks ("DNNs"), have multiple layers of nodes, and nodes of adjacent layers may be connected to each other. Conceptually, the nodes may be thought of as calculating output values as a function of a plurality of different input values. Each connection between the various nodes of adjacent layers may be associated with a respective weight. When processing input data in the form of a vector (e.g., one or more feature vectors containing information extracted from portions of audio data), a neural network may multiply each input vector by a matrix representing the weights associated with connections between the input layer and the next layer, apply a nonlinearity function to the results, and then repeat the process for each subsequent layer of the neural network. For example, a neural network acoustic model used in automatic speech recognition ("ASR") may contain several layers, including an input layer, an output layer, and any number of intermediate or "hidden" layers. Acoustic scores (e.g., probabilities that the input corresponds to each phoneme or other subword unit of a language) may be obtained by doing a forward pass. The forward pass involves multiplying the large weight matrices representing the connection weights between nodes of adjacent layers by vectors corresponding to one or more feature vectors (from the input layer) or hidden representations (from the subsequent hidden layers), and applying a nonlinearity function to the result.

Many conventional ASR systems suffer from a lack of robustness when processing utterances in the presence of acoustic interference, such as media playback, interfering speech, and other environmental noise. Excess acoustic interference can degrade the accuracy of ASR by interfering with recognition of words or subword units (e.g. phonemes, triphones, context-dependent phoneme states, etc.), by causing words or subword units to "sound" differently than expected by the models of the ASR system, etc. In some ASR systems, the effects of acoustic interference can be mitigated by training the models of the ASR system using training data captured in, or generated to mimic, noisy environments and situations. Some ASR systems use models that are trained using training data corresponding to a wide variety of noise environments and situations, known as multi-condition or multi-style training, while other ASR systems use models trained using training data corresponding to a single or small number of targeted environments or situations. Regardless of which method is used, such models generally do not reduce the acoustic interference in an input signal, but instead are simply trained with noisy input signals as a portion of input signals to be modeled. Thus, the models may be trained to recognize particular subword units in the presence of particular interference, and may not perform well in noisy environments that differ from those of the training data.

Some aspects of the present disclosure relate to neural network acoustic models trained using source-separation-style training to isolate the speech portion of an audio signal. Such neural network acoustic models can then recognize words or subword units in the isolated speech portion of the signal more accurately than conventional models recognize words or subword units in corrupted or "mixed" input signals (e.g., input signals, received from a single microphone or microphone array, that include both data corresponding to an utterance and data corresponding to unwanted sounds, such as interference from media playback, other speech, other environmental noise, etc.). To facilitate source-separation-style training, the neural network acoustic models are configured to produce side task outputs in addition to the main acoustic model output. In some embodiments, the side task outputs include a prediction of the isolated speech portion of an input signal, and a separate prediction of an isolated interference portion of the input signal. The side task outputs are produced by side task output layers connected to one or more hidden intermediate layers of the neural network. The main acoustic model output is produced by a main output layer connected to a subsequent layer of the neural network. Thus, certain layers of the neural network are configured and trained to predict, for a given input signal, the speech component and interference component of the input signal. Later layers of the neural network can then use the predicted speech component (or data derived at least partly therefrom) to generate the main acoustic model output (e.g., probabilities that the input corresponds to each phoneme or other subword unit of a language).

Additional aspects of the present disclosure relate to methods of updating neural network acoustic model parameters during training using side task outputs. Conventional training methods generally involve optimization of a "loss" function, also referred to as an "objective" function. A loss function is used to determine a degree to which output for a given training data input differs from the expected or desired output for the given training data input. A gradient of the loss function with respect to the parameters of the neural network is computed, and the parameters of the neural network are then modified to minimize the loss function and, therefore, minimize the degree to which output differs from expected or desired output. However, in some cases the use of a single loss function for a single output can cause the optimization to reach a local minimum rather than finding a true global minimum and thus true optimization. In the source-separation style training described herein, a weighted composite of loss functions for each of the individual outputs—the main acoustic model output and the two side task outputs—is optimized. In some cases, the main acoustic model output may be referred to as the main task output or primary task output, and side task outputs may be referred to as secondary task outputs or auxiliary task outputs. An advantage of multi-task training is that the main task loss function alone is often not exactly matched to the actual objective of the task/model, and the side tasks help to match it better. By including additional data from the side task loss functions in the optimization procedure, true global optimization (or a point substantially close thereto) may be achieved more effectively.

Further aspects of the present disclosure relate to methods of obtaining or generating the training data used in the source-separate-style training of neural network acoustic models. The training data may be obtained using a system of microphones, with one microphone for each of the audio signals to be generated. Although many examples in this disclosure will focus on the use of individual microphones, in some embodiments one or more microphone arrays may be used instead of, or in addition to, some or all of the individual microphones described herein. A first microphone can be positioned in a location that corresponds to the location of a microphone of a deployed ASR system with respect to a user and sources of interference (e.g., media system speakers). This first microphone can capture the mixed audio input that includes both user speech audio and interference audio. A second microphone can be positioned relatively closer to the user making the utterance to be recognized. This second microphone can capture the reference speech audio. A third microphone can be positioned relatively closer to one or more sources of interference. This third microphone can capture the reference interference audio. The input signal and/or reference speech audio signal can then be annotated to determine the correct transcription of the user's utterance for use in training. In some embodiments, no input signal microphone is used. Instead, the reference speech microphone is used, and interference may be applied to the reference speech signal to generate an artificial mixed input signal. The interference may be captured from the reference interference signal microphone, or it may be artificially generated. When artificially generated, the interference may also be provided as a reference interference signal instead of, or in addition, to, a signal provided by a reference interference signal microphone.

Various aspects of the disclosure will now be described with regard to certain examples and embodiments, which are intended to illustrate but not limit the disclosure. Although the examples and embodiments described herein will focus, for the purpose of illustration, on specific devices and methods of signal analysis and processing in the context of acoustic modeling for automatic speech recognition, one skilled in the art will appreciate that the example devices and methods described herein are illustrative only, and are not intended to be exhaustive or limiting.

Example Neural Network Acoustic Model

FIG. 1 depicts an illustrative neural network acoustic model 100 configured to produce main acoustic model output and side task output. As shown, the neural network includes a main acoustic model output layer 114, and two side task output layers: a reference speech prediction output layer 108 and a reference interference prediction output layer 110. The neural network 100 also includes various intermediate hidden layers, such as hidden layer subsets 104, 106, and 112. Hidden layer subset 104 may include one or more layers, and may process input, such as an input vector 102. The hidden layer processing results from hidden layer subset 104 can then be processed by hidden layers subsets 106 for output by one or both side task output layers 108 and 110. Hidden layer subset 104 may also pass the processed input, or some portion thereof, to hidden layer subset 112. Hidden layer subset 112 may perform further processing and provide data for output by the main acoustic model output layer 114.

The neural network 100 may accept input in the form of input feature vectors 102, also referred to as input vectors. As shown, the input vectors 102 include data regarding acoustic features of the input signal (the audio signal that represents speech corrupted by interference). Typical input feature vectors for speech recognition include mel frequency cepstral coefficients ("MFCCs"), perceptual linear predictions ("PLPs"), and the like. In one specific non-limiting embodiment, the input vectors may be logarithmic Mel-filter bank energy ("LFBE") vectors, where the acoustic features represented in the input vector are LFBEs. An LFBE vector represents the level of energy in various frequency bands of a signal frame (e.g., a 20 millisecond sample window of the signal). For example, an LFBE vector may be of length twenty and indicate the energy in twenty different frequency bands. The frequency bands may be spaced linearly, or may be on a mel scale (e.g., spaced such that they perceived by listeners to be equally spaced, even though they are not equally spaced from a mathematical point of view). In one example, an LFBE vector may be computed as follows: (1) compute a Fourier transform of a frame of the input signal to obtain a frequency spectrum; (2) convert the spectrum to a mel scale using triangular overlapping windows in which each window represents a separate filter from a filter bank, and the filters are applied to corresponding frequencies of the spectrum to produce weighted sums (e.g., if there twenty filters in the filter bank, there will be twenty triangles and twenty weighted sums to calculate by multiplying the filter values for individual frequencies by corresponding values of the transformed frame); and (3) take the logarithm of each separate energy value (e.g., each separate weighted sum of the twenty weighted sums) to obtain the LFBE vector. A concatenated LFBE vector may be generated as the concatenation of a sequence of LFBE vectors into a single vector. The concatenation may be performed for each frame. For example, a concatenated LFBE vector may be a concatenation of nine sequential LFBE vectors. For an $n^{th}$ frame, the concatenated LFBE vector may comprise the LFBE vectors from frame n−4 to frame n+4.

After receiving an input vector 102 (or concatenated input vector, or set of input vectors, etc.), the input 102 may presented to the first subset of hidden layers 104. The hidden layers 104 may include one or more layers configured to predict the separate speech and interference portions of the input signal. The hidden layers 106 can apply weights, biases, and activation functions to the input vector 102 or to previous layers of the hidden layers 106. For example, the input vector 102 may include n values (wherein n is some integer). The first hidden layer may include n nodes, and subsequent layers may include the same or a different number of nodes. For example, a second hidden layer may include m nodes (where m is some integer <, =, or >n), and each node may be connected to each of the n nodes of the first hidden layer (e.g., the value output from each of the n nodes of the first hidden layer may be provided to each of the m nodes of the second hidden layer).

The values from the input vector or nodes of a preceding hidden layer may be weighted and biased using equation [1]:

$$y = f(wx+b) \quad [1]$$

where x is the input value provided from an individual node in a hidden layer to an individual node in a subsequent hidden layer, w is a weight associated with the specific connection from that node of the hidden layer to the node of the subsequent hidden layer, b is a bias added to all inputs into the particular node of the subsequent hidden layer, and f( ) is an activation function for the specific node of the subsequent hidden layer. The activation function is typically a linear or nonlinear function applied to the weighted and biased input. Some commonly used nonlinear functions include the logistic sigmoid function, the rectifier function (as implemented by rectified linear units or "RLUs"), etc. If the first subset of hidden layers 104 includes more than one hidden layer, the process of applying an activation function to the weighted and biased output of prior layers may be repeated for each node of each subsequent hidden layer of the first subset of hidden layers 104.

After the first subset of hidden layers 104 has completed processing, output from the last hidden layer of the first subset of hidden layers 104 may be provided to the side task hidden layers 106 (or, in some embodiments, directly to one or both of output layers 108 and 110), which may then apply weights, biases, and activation functions as described above. The side task output layers 108 and 110 may then produce output vectors that are predictions of vectors for the reference speech signal (the signal representing audio of the utterance with relatively less interference than the input signal) and reference interference signal (the signal representing audio of the acoustic interference with relatively less of the speech than the input signal), respectively, that correspond temporally to the input vector extracted from the input signal input as described above. For example, the input signal input vector may be a vector of features extracted from a portion of the input signal corresponding to a time t within the input signal. The output from the reference speech output layer 108 may be a reference speech prediction feature vector that includes acoustic features predicted for the reference speech signal at the same time t as the input signal (e.g., the features, such as LFBEs, that would be extracted from the reference speech signal at the same relative time t as the input signal input vector features from which the prediction was made). Similarly, the output from the reference interference output layer 110 may be a reference interference prediction feature vector that includes acoustic features predicted for the reference interference signal at the same time t as the input signal. In this way, the neural network 100 is configured to separate the various source signals from the single input signal.

In addition to providing output to the side task output layers 108 and 110, the last hidden layer of the first subset of hidden layers 104 may provide output to the second subset of hidden layers 112. The second subset of hidden layers 112 may include one or more layers configured to determine, for each subword unit of a language, a probability that the input signal at the time t includes audio of the subword unit. However, because the first subset of hidden layers 106 is configured to predict the reference speech, the second subset of hidden 112 does not need to use only the input signal to determine the probabilities. Rather, the second subset of hidden layers 112 can use the predicted reference speech, alone or in combination with input signal, predicted interference, or other information, to determine the probabilities. Thus, the second subset of hidden layers 112 can be configured to produce accurate output for substantially "clean" speech data, or for speech data that suffers from less acoustic interference than that processed by other acoustic models. Illustratively, the second hidden layers 112 can operate the manner described above with respect to the first subset of hidden layers 108, applying activation functions to weighted and biased output from previously layers, passing the output to subsequent layers, etc. The second subset of hidden layers can provide output the main acoustic model output layer 114, which produces the acoustic model probabilities described above.

In some embodiments, the neural network 100 may receive input in a different format that input vectors of features extracted from audio signals. For example, the input may be the signal itself (or some portion thereof), and early layers of the neural network 100 can process the signal into a form usable by the neural network 100. In some embodiments, the side task output layers may produce output in a different format than vectors of features predicted to be present in reference signal feature vectors. For example, the output of one or both side task output layers may be a predicted reference signal itself (or some portion thereof), and can thus be directly compared to the corresponding actual reference signal.

In some embodiments, the neural network 100 may have more than one set of side task output layers, more than two subsets of hidden layers, only one set of hidden layers, or some other configuration of hidden layers and output layers. For example, the neural network 100 may produce reference speech prediction output and/or reference interference prediction output multiple times, rather than only one time each. As another example, the neural network 100 may produce reference speech prediction output from one subset of one or more hidden layers, and produce reference interference prediction output from a different subset of one or more hidden layers. As a further example, neural network 100 may produce all three outputs—the main acoustic model output and the two side task output—from a single set of one or more hidden layers (e.g., the three output layers may all be connected to the last hidden layer). In some embodiments, combinations of features from any or all of the examples above may be combined into a single neural network 100.

The neural network 100 can be trained using, e.g., the process 400 described in detail below. After the neural network 100 is trained, the output layers 108 and 110 for the side tasks can be removed or otherwise disabled, and the neural network 100 can be trained further (e.g., using additional training data that does not include reference speech and interference signals) and/or deployed for use in a production ASR system. Advantageously, by removing or otherwise disabling the side task output layers 108 and 110, the neural network may be used with existing ASR systems configured to perform ASR using a neural network acoustic model that receives input vectors of features extracted from audio signals, and produces acoustic model output.

Figure 2:
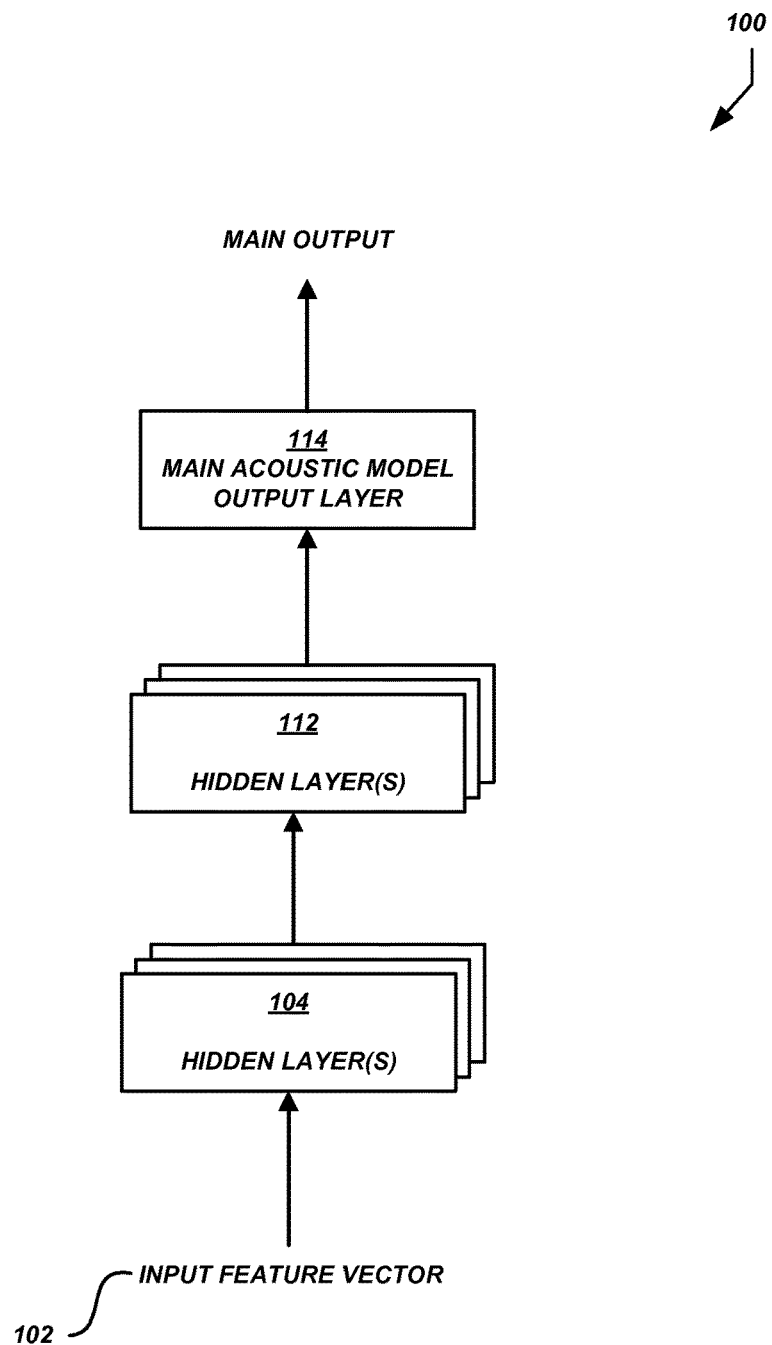
FIG. 2 is a diagram of the neural network acoustic model of FIG. 1 with output layers for the side tasks removed.

FIG. 2 shows the neural network 100 of FIG. 1 with output layers for the side tasks removed. As shown, the neural network 100 continues to accept input vectors 102 of features extracted from audio signals. The neural network 100 also retains at least a portion of the first subset of hidden layers 104 and the second subset of hidden layers 112. However, the first subset of hidden layers 106 is now connected only to the second subset of hidden layers 112, rather than to side task hidden layers 106 which, along with output layers 108 and 110, have been removed. The second subset of hidden layers 112 continues to feed into the main acoustic model output layer 114.

When the output layers 108 and 110 for the side tasks are removed from the neural network 100, the hidden layers 106 that serve only to process data for eventual output by one or both of the side task output layers 108 and 110 may also be removed from the neural network 100. In removing such hidden layers 106, the output of the main acoustic model output layer 114 will not be affected because the removed layers were not directly connected to the main acoustic model output layer 114, and were not indirectly connected to the main acoustic model output layer though any hidden layer between the removed hidden layers 106 and the main acoustic model output layer 114. Thus, the values produced by the removed hidden layers 106 would not be used in calculating any subsequent value from which the main acoustic model output (e.g. probabilities for individual phonemes) is derived.

In some embodiments, rather than removing the nodes and hidden layers 106 that serve only to process data for eventual output by a side task output layer 108 or 110, such nodes and hidden layers may remain in the neural network 100. In such cases, the output of the nodes may be disregarded, or the nodes themselves may be disabled such that they do receive the output of previous layers or such that they do not act upon the output of previous layers (e.g., they do not apply activation functions to weighted and biased output of previous layers). In some embodiments, some or all of the hidden layers 106, independently of or in addition to side task output layer 108 and/or 110, may remain in the neural network 100. For example, the hidden layers 106 and/or side task output layers 108/110 may be connected to one or more of the second subset of hidden layers 112, and may be used by the second subset of hidden layers 112 during acoustic model processing. In such cases, the reference clean signal prediction itself, or a combination of the reference clean signal prediction and reference interference signal may be used by downstream layers (represented by higher hidden layers 112 in FIGS. 1 and 2) of the neural network 100 to generate the main acoustic model output.

Example Training Data Capture Environment

Figure 3:
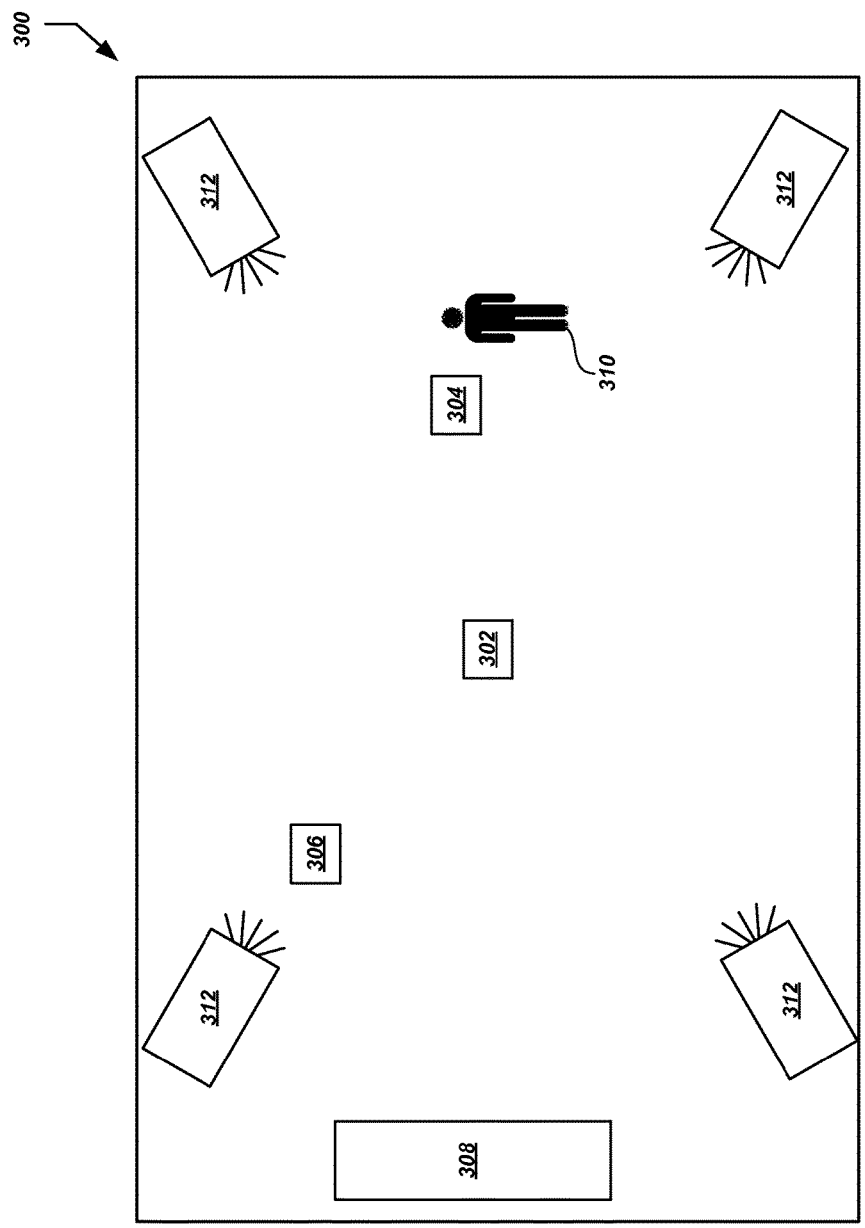
FIG. 3 is a diagram of an illustrative environment for capturing training data for use in training a neural network acoustic model using side tasks to predict reference signals.

FIG. 3 shows an illustrative environment 300 for capturing training data to be used in source-separation-style training processes. The environment 300 includes an input signal microphone 302, a reference speech signal microphone 304, a reference interference signal microphone 306, and a data aggregation system 308. In addition, various sources of audio are present in the environment, such as a user 310 and one or more acoustic interference sources 312 (e.g., playback speakers producing audio output from a multimedia playback system, such as a television, stereo, computer, or the like).

The various microphones 302, 304, and 306 are used to capture audio in the environment 300 and provide audio signals to the data aggregation system 308, which may also be referred to as a data capture and collection system. In some embodiments, the input signal microphone 302 may be positioned in a location that corresponds to the location of an input microphone for the ASR system that will use the deployed neural network acoustic model illustrated in FIG. 2. For example, if the ASR system is used by a home media system, set top box, personal computer, or some other electronic appliance, the input signal microphone 302 can be positioned within the environment 300 at or near the location that microphone for the ASR system will be placed.

In some embodiments, the reference speech signal microphone 304 can be positioned at a location from which it can capture audio of the user 310 speaking that is clearer relative to the audio captured by the input signal microphone 302. For example, the reference speech signal microphone 304 may be placed such that a first distance between the reference speech signal microphone 304 and the user 310 is less than a second distance between the input signal microphone 302 and the user 310 (e.g., the first distance is about ½, ¼, or ¹⁄₁₀ of the second distance). As another example, the distance between the reference speech signal microphone 304 and the user 310 may be selected to be within a threshold distance from user 310 or otherwise to optimize the clarity of speech captured by the reference speech signal microphone 304. As a further example, the reference speech signal microphone 304 may be worn by or held by the user 310 (e.g., attached to the user's clothing, held in the user's hand, integrated with a head-worn or other hands-free component, etc.).

In some embodiments, the reference interference signal microphone 306 can be positioned at a location from which it can capture audio of the interference sources 312 (e.g., playback speakers) that is clearer relative to the audio captured by the input signal microphone 302. For example, the reference interference signal microphone 306 may be placed such that a first distance between the reference interference signal microphone 306 and a playback speaker 312 is less than a second distance between the input signal microphone 302 and the playback speaker 312 (e.g., the first distance is about ½, ¼, or ⅒ of the second distance). As another example, the distance between the reference interference signal microphone 306 and the playback speaker 312 may be selected to be within a threshold distance from the playback speaker 312 or otherwise to optimize the clarity of acoustic interference captured by reference interference signal microphone 306. As a further example, the reference interference signal microphone 306 may be mounted to a playback speaker 312.

The various microphones 302, 304, and 306 can capture audio while the user 310 is speaking and/or the playback speaker 312 is producing acoustic interference. The microphones 302, 304, and 306 can provide audio signals to the data aggregation system 308. Illustratively, the data aggregation system 308 may be a computing system configured to receive and store signals and other data, provide the stored data to other computing systems, etc. For example, the data aggregation system 308 can store the signals received from the various microphones, acoustic features of the signals, or some other data derived from the signals, for use in source-separation-style training of neural network acoustic models. For example, the data aggregation system 308 can store acoustic features by computing LFBEs for frames of the signals, as described in greater detail above. In some embodiments, the data aggregation system 308 can upload the signals and/or data to a server for use in subsequent training processes.

In some embodiments, a reference interference signal may be generated using additional or alternative methods and/or components. For example, the data aggregation system 308 may receive a reference interference signal directly from a multimedia playback system or from some other source of the playback signal eventually provided to the playback speaker(s) 312. As another example, the data aggregation system 308 may receive an interference echo estimate from the output of an acoustic echo cancelation ("AEC") component or module, and the interference echo estimate (or data derived therefrom) may serve as the reference interference signal.

Example Process for Source-Separation-Style Training

Figure 4:
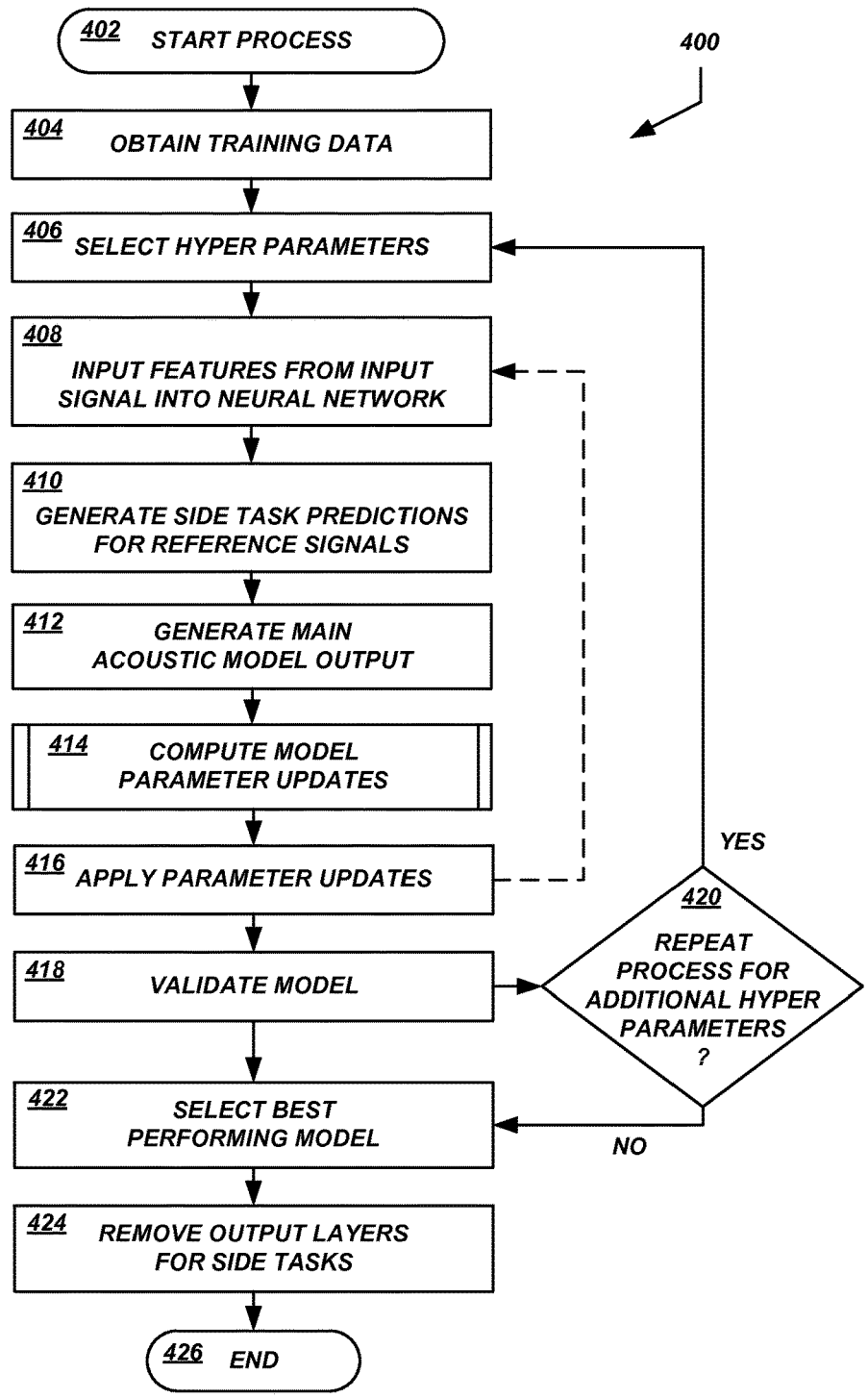
FIG. 4 is a flow diagram of an illustrative process for training a neural network acoustic model using side tasks to predict reference signals.

FIG. 4 shows an illustrative process 400 for source-separation-style training of a neural network acoustic model configured to generate side task output predictions of reference speech and interference signals. Advantageously, the neural network acoustic model trained in this manner can generate a prediction or estimate of isolated or substantially isolated speech input without acoustic interference or with a reduced level of acoustic interference. The neural network acoustic model can then generate acoustic model output using the prediction of the isolated speech input, thereby producing more accurate results than acoustic models trained using conventional methods.

The process 400 begins at block 402. The process 400 may be embodied in a set of executable program instructions stored on a computer-readable medium, such as one or more disk drives, of a computing system, such as the computing system 600 shown in FIG. 6 and described in greater detail below. When the process 400 is initiated, the executable program instructions can be loaded into memory, such as RAM, and executed by one or more processors of the computing system. Although the process 400 is described with respect to the computing system 600 shown in FIG. 6, the description is illustrative only and is not intended to be limiting. In some embodiments, the process 400 or portions thereof may be performed serially or in parallel by multiple computing systems. Some examples of computing systems and parallel training methods are described in U.S. patent application Ser. No. 14/087,852, filed on Nov. 11, 2013 and entitled "DISTRIBUTED TRAINING OF MODELS USING STOCHASTIC GRADIENT DESCENT," the contents of which are hereby incorporated by reference.

At block 404, the computing system 600 can obtain training data for use in training a neural network acoustic model, such as the neural network 100 shown in FIG. 1. The training data can include audio signals obtained, directly or indirectly, from one or more data aggregation systems, such as the data aggregation system 308 shown in FIG. 3, or from some other source. In addition, the training data can be annotated or include transcriptions of the utterances to be recognized during the training process (e.g., the training data may include data to help align portions of the transcriptions, such as individual words or subword units, with corresponding portions of the signals). The computing system 600 may extract features from the audio signals to generate feature vectors for use during the training process 400, such as input feature vectors from the input signal for input into the neural network, reference speech feature vectors from the reference speech signal to determine the accuracy of the reference speech prediction, reference interference feature vectors from the reference interference signal to determine the accuracy of the reference interference prediction, etc. Illustratively, the input feature vectors, reference speech feature vectors, and reference interference feature vectors may be LFBE-based feature vectors, such as those described in greater detail above. In some embodiments, the training data obtained at block 404 may already be in feature vector form (for the various audio signals) and associated with corresponding correct subword units of the annotated transcriptions.

At block 406, the computing system 600 can determine certain parameters, known as "hyper parameters," for use during the training process. The source-style-separation training process seeks to optimize all three outputs of the neural network 100, rather than only the main acoustic model output. To do so, different loss functions may be used to determine the error for each of the three different outputs—the main acoustic model output and the two side task outputs. Model parameters (e.g., the weights and biases associated with connections between nodes and individual nodes) can then be updated to optimize model output such that a weighted composite of all three loss functions is minimized (e.g., the total error of model output is minimized). In this example, the hyper parameters are the weighting factors for each of the individual loss functions in the weighted composite loss function. The weighting factors are typically different for each of the loss functions due to the different types of loss functions used. For example, a cross entropy loss function may be used to determine the error in the main acoustic model output, because such functions perform well for determining the error in discrete outputs such as the discrete set of probabilities in the main acoustic model output. As another example, an L2 loss function may be used to determine the error in one or both of side task outputs, because such functions perform well for determining the error in continuous outputs such as the reference signal predictions. The process 500 shown in FIG. 5 and described in detail below is one example of a process for optimizing a weighted composite of loss functions during neural network training.

In some embodiments, the hyper parameter values may be determined by experimenting with several different sets of values, and selecting the best performing set. The computing system 600 can generate (or a technician can provide the computing system 600 with) a range of values that the weights can take. For example, the weight for the main acoustic model output may be fixed at 1.0 due to its importance in the overall training process, and the weights for the side tasks may each, jointly or independently, be assigned a value within the range of 0.01 to 0.1. The computing system 600 can pick n values (where n is some integer) within that range for each of the side tasks, resulting in $n^2$ combinations of possible hyper parameter values (assuming the weight for the main output is always 1). The computing system 600 can then perform a grid search of the possible values by repeating the remaining portions of the process 400 for each of the possible combinations to generate $n^2$ trained neural networks. Each of the $n^2$ neural networks can then be tested on another set of training data, and the best-performing (e.g., most accurate) neural network can be selected for deployment.

At block 408, the computing system 600 can input an input vector or subset of training data input vectors into the neural network 100. For example, an input vector may have n elements (wherein n is some integer), and the first hidden layer of the first subset of hidden layers 104 of the neural network 100 may have n nodes. Each element of the input vector may correspond to a node of the first hidden layer of the first subset of hidden layers 104. The first hidden layer of the first subset of hidden layers 104 may apply weights, biases, and activation functions to the input vector and pass the resulting values to the next hidden layer of the neural network 100 as described in greater detail above.

At block 410, the computing system 600 can produce test output for the input feature vector. The test output can include a reference speech prediction output and a reference interference prediction output. Illustratively, the computing system 600 can process the input using the first subset of hidden layers 104 and side task hidden layers 106, as described in greater detail above, and the side task output layers 108 and 110 may produce reference speech prediction output and reference interference prediction output, respectively.

At block 412, the computing system 600 can continue producing the test output for the input feature vector by producing main acoustic model output. Illustratively, the computing system 600 can continue the neural network processing using the second subset of hidden layers 112, as described in greater detail above, and the main acoustic model output layer 114 may produce main acoustic model output.

At block 414, the computing system 600 can compute updates to the parameters of the neural network using a composite of weighted loss functions. The process 500 shown in FIG. 5 and described in detail below is one example of a process for determining neural network parameter updates to optimize a weighted composite of loss functions.

At block 416, the computing system 600 can apply the updates, determined above, to the parameters of the neural network. In some embodiments, the parameter updates determined for an individual input vector or a single neural network forward pass may be applied to the model parameters before processing the next input vector or performing the next forward pass. If there are additional input vectors in the training data, the process 400 may then return to block 408 and repeat blocks 408-416 for each input vector of the training data. In some embodiments, the parameter updaters for the entire set of training data, or for subsets of training data, may be aggregated before applying them to the model parameters. In these embodiments, blocks 408-414 may be repeated for each input vector of the training data or current subset before the aggregated updates are applied at block 416. Processing may then return to block 408 if there are additional subsets of training data to process, or if all training data is to be processed again.

At block 418, the computing system 600 can validate the neural network acoustic model 100 after all (or a desired subset) of training data has been processed and the model parameters have been updated to achieve a threshold level of optimization. Validation of the neural network 100 can involve processing a held-out portion of the training data to determine the accuracy of the trained model on data that was not part of the training process described above.

At decision block 420, the computing system 600 can determine whether there are additional sets of hyper parameter values to test. If so, the process 400 can return to block 406. Otherwise, the process 400 can proceed to block 422.

At block 422, the computing system 600 can select the best-performing neural network acoustic model for deployment. The best-performing neural network may be the individual neural network, of the $n^2$ neural networks validated at bock 418, achieving the highest accuracy, lowest error, etc.

At block 424, the computing system 600 can remove or otherwise disable the side task output layers of the best-performing neural network, as described in greater detail above with respect to FIG. 2, to generate a neural network for deployment and use in an ASR system.

Example Process for Determining Neural Network Parameter Updates

Figure 5:
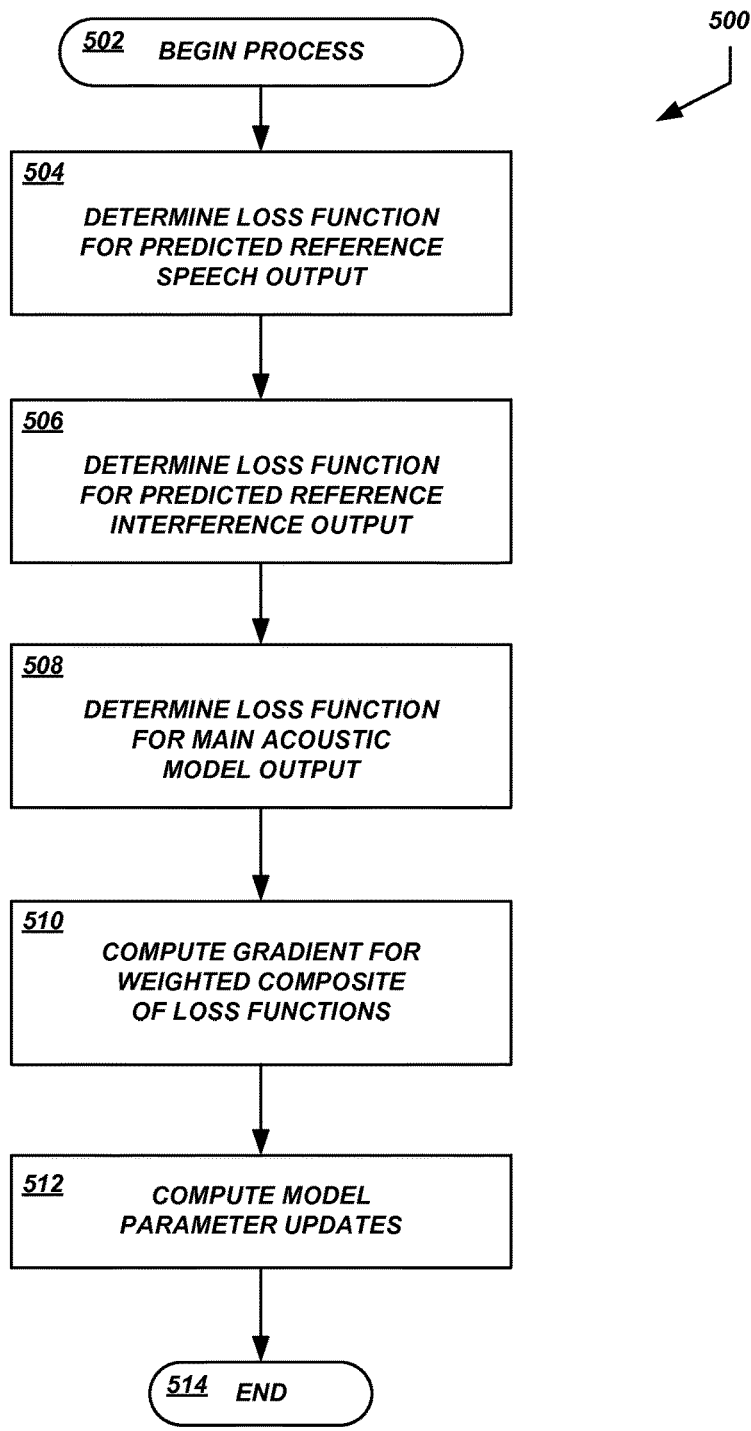
FIG. 5 is a flow diagram of an illustrative process for using side task predictions of reference signals to compute updates to parameters of a neural network acoustic model.

FIG. 5 shows an illustrative process 500 for determining neural network parameter updates in source-separation-style training. Advantageously, the process 500 determines the parameter updates to optimize all three neural network outputs—the main acoustic model output and both side task outputs—rather than only optimizing the main output. Thus, the true global optimization (or a point substantially close thereto) may be achieved with a reduced chance of reaching a local optimization.

The process 500 begins at block 502. The process 500 may be embodied in a set of executable program instructions stored on a computer-readable medium, such as one or more disk drives, of a computing system, such as the computing system 600 shown in FIG. 6 and described in greater detail below. In some embodiments, the process 500 may be part of the process 400 described above (e.g., block 414), or it may be a separate process that is invoked by the process 400. When the process 500 is initiated, the executable program instructions can be loaded into memory, such as RAM, and executed by one or more processors of the computing system. Although the process 500 is described with respect to the computing system 600 shown in FIG. 6, the description is illustrative only and is not intended to be limiting. In some embodiments, the process 500 or portions thereof may be performed serially or in parallel by multiple computing systems.

At block 504, the computing system 600 can determine a side task loss function for the predicted reference speech output with respect to the actual reference speech signal. In some embodiments, the loss function may be an L2 loss function of the form shown in equation [2]:

$$C = \sum_{i}^{n} (y_i - x_i)^2 \quad [2]$$

where n is the size of the training set or subset (e.g., the number of forward passes for which the loss function is computed), $y_i$ is the expected or desired side task output for the ith input of the set, and $x_i$ is the side task output for the ith input. As shown, the L2 loss function is a sum of the squared differences between the expected output and the actual side task output.

At block 506, the computing system 600 can determine a side task loss function for the predicted reference interference output with respect to the actual reference interference signal. In some embodiments, the loss function may be an L2 loss function of the form shown in equation [2] above.

At block 508, the computing system 600 can determine a main task loss function for the main acoustic model output with respect to the correct or annotated acoustic model output. In some embodiments, the loss function may be a cross entropy loss function of the form shown in equation [3]:

$$C = -\frac{1}{n} \sum_{i}^{n} [y_i \ln x_i + (1 - y_i) \ln(1 - x_i)] \quad [3]$$

where n is the size of the training set or subset (e.g., the number of forward passes for which the loss function is computed), $y_i$ is the expected or desired output for the ith input of the set, and $x_i$ is the main acoustic model output for the ith input. As shown, the cross entropy loss function is an average of the sums of (1) the product of the expected output and a natural log of the main acoustic model output, and (2) the product of 1 minus the expected output and a natural log of 1 minus the main acoustic model output.

At block 510, the computing system 600 can compute a weighted composite of the loss functions determined above, and a gradient for the weighted composite of loss functions. In some embodiments, the weighted composite of the loss functions has the form of a weighted sum, as shown in equation [4]:

$$C = w_1 C_1 + w_2 C_2 + w_3 C_3 \quad [4]$$

where $w_1$ and $C_1$ are the weight (hyper parameter) and loss function, respectively, for the main acoustic model output; $w_2$ and $C_2$ are the weight (hyper parameter) and loss function, respectively, for the reference speech prediction output; and $w_3$ and $C_3$ are the weight (hyper parameter) and loss function, respectively, for the reference interference prediction output.

The computing system 600 can compute the gradient of the composite loss function with respect to the individual parameters of the neural network. The gradient can be computed as the derivative $\partial C/\partial w$ of the cost function C with respect to any weight w (or bias b) in the network. This gradient will be used to modify the parameters (e.g., the weights and/or biases) of the nodes of the neural network to reduce the error of the neural network (e.g., the difference between the actual output for a given input and the correct or preferred output for the input), as determined using the composite loss function.

Illustratively, the activation function for a particular hidden layer node k, connected to a node j from a previous hidden layer and also connected to a node x in the output layer, may be a sigmoid function. The sigmoid function may take, as input, the product of a weight and the output of node j from the previous hidden layer. The computing system 600 can determine the derivative of the composite loss function at output layer node x with respect to the output of the hidden layer node k. Thus, the computing system 600 determines the derivative of the composite loss function with respect to the sigmoid function applied to the weighed input value. This process may be repeated for each pair of connected nodes that includes a node from the output layer and a node from the immediately preceding hidden layer to which the output layer node is connected.

At block 512, once the gradient is computed, the computing system 600 can determine and apply the updates to the individual parameters of the neural network in a process known as backpropagation. In backpropagation, the output error is propagated back through the layers of the neural network, and the gradient is used at each node to determine parameter updates that will reduce the error (e.g., using gradient descent). For example, the process described above, for determining updates to hidden layer node parameters based on the output of output layer nodes to which the hidden layer nodes are connected, may be repeated for each connected pair of inter-hidden-layer nodes (e.g., for each pair of connected nodes from one hidden layer and the immediately preceding hidden layer, and so on).

In some embodiments, the gradient of the weighted composite loss function may be computed at the end of each branch (e.g., beginning at the main task output layer 114 and side task output layers 108, 110) by setting the loss function terms for the other branches to zero. In this way, the gradient for one branch does not factor in losses from other branches. When two or more branches merge at a particular hidden layer (e.g., the last hidden layer of the first subset of hidden layers 104, from which the individual branches emerge), the gradient may be computed with respect to the weighted composite loss function with all loss function terms computed in the composite loss function. In some embodiments, gradients of individual weighted loss functions are computed at each branch of the neural network separately (e.g., beginning at the main task output layer 114 and side task output layers 108, 110). When two or more branches merge at a particular hidden layer, the gradient may then be computed with respect to the weighted composite loss function.

As described above, training data may be processed by a neural network using a forward pass, an error of the output may be determined, and backpropagation may be used to propagate the error back through the neural network to update the network parameters and reduce the error the next time the training data input is processed using a forward pass. One specific method of using backpropagation is to determine and apply updates to the model parameters every time a training input is processed in a forward pass. Another method includes computing the true gradient of the error over the entire training set (or some subset or "mini-batch" thereof) by summing, for each individual parameter, the updates determined for each individual training input of the relevant set. The parameters may then be updated after the corresponding sums are computed.

Execution Environment

Figure 6:
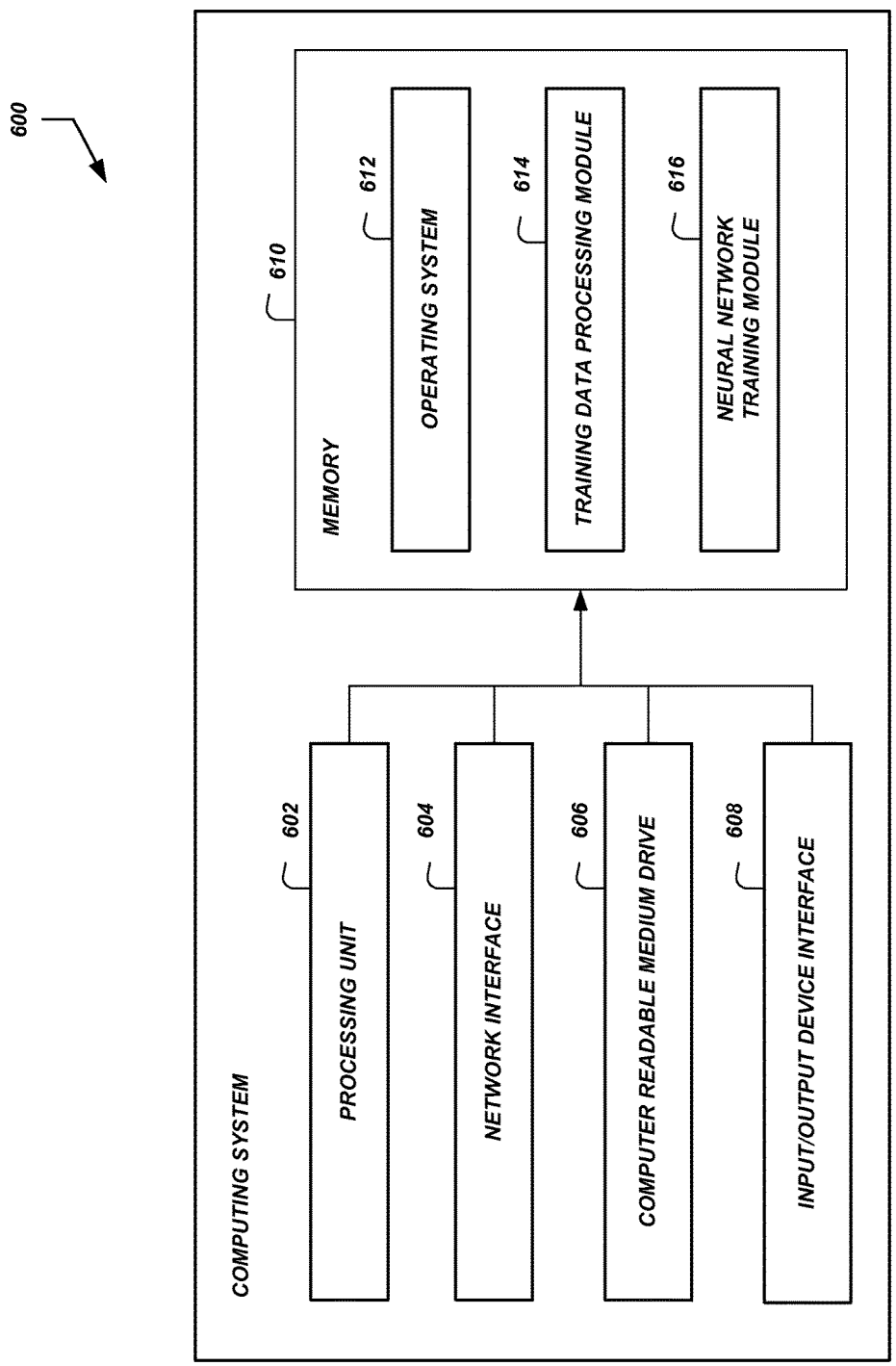
FIG. 6 is a block diagram of an illustrative computing system configured to implement training of a neural network acoustic model using side tasks to predict reference signals.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure. For example, in one embodiment, the computer readable memory 610 may include a training data processing module 614 that performs the operations described above with respect to obtaining, generating, or otherwise processing training data for use in training neural network acoustic models using side tasks. As another example, the computer-readable memory 610 may include a neural network training module 616 that performs the processes 400 and 500 described above (or portions thereof) to train neural network acoustic models using side tasks. In some embodiments, multiple computing systems 600 may communicate with each other via their respective network interfaces 604, and can implement neural network acoustic model training separately (e.g., each computing system 600 may execute one or more separate instances of the processes 400 and/or 500), in parallel (e.g., each computing system 600 may execute a portion of a single instance of a process 400 and/or 500), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a non-transitory computer-readable memory storing executable instructions; and
    one or more computer processors in communication with the computer-readable memory, wherein the one or more computer processors are programmed by the executable instructions to at least:
        obtain acoustic model training data comprising:
            an input feature vector for input into an acoustic model, wherein the acoustic model comprises a neural network, and wherein the input feature vector comprises measurements of energies in a portion of an input signal, the input signal representing audio of both an utterance and acoustic interference;
            a reference speech feature vector, the reference speech feature vector comprising measurements of energies in a portion of a reference speech signal, the reference speech signal representing audio of the utterance substantially isolated from audio of the acoustic interference; and
            a reference interference feature vector, the reference interference feature vector comprising measurements of energies in a portion of reference interference signal, the reference interference signal representing the audio of the acoustic interference substantially isolated from the audio of the utterance;
        generate, using the neural network and the input feature vector, a test output comprising:
            a main acoustic model output comprising, for individual subword units of a plurality of subword units, a corresponding probability that at least a portion of the input feature vector represents audio comprising the subword unit;
            a speech prediction feature vector comprising, for individual measurements of energies in the portion of reference speech signal, a corresponding prediction of the measurement of the energy in the portion of the reference speech signal, wherein the prediction of the measurement of the energy in the portion of the reference speech signal is separate from the main acoustic model output; and
            an interference prediction feature vector comprising, for individual measurements of energies in the portion of the reference interference signal, a corresponding prediction of the measurement of the energy in the portion of the reference interference signal, wherein the prediction of the measurement of the energy in the portion of the reference interference signal is separate from both the prediction of the measurement of the energy in the portion of the reference speech signal and the main acoustic model output;
        compute a gradient of a weighted sum of loss functions, the weighted sum of loss functions comprising a main loss function, a first side task loss function, and a second side task loss function, wherein the main loss function represents a difference between the main acoustic model output and expected acoustic model output for the input feature vector, wherein the first side task loss function represents a difference between the speech prediction feature vector and the reference speech feature vector, and wherein the second side task loss function represents a difference between the interference prediction feature vector and the reference interference feature vector;
        modify a value of a parameter of the neural network by an amount indicated by the gradient, wherein the gradient indicates a degree to which the weighted sum of loss functions changes with respect to a change in the parameter, and wherein the amount indicted by the gradient is based on a desired change in the weighted sum of loss functions;
        process, using the neural network with the value of the parameter that has been modified, a second input feature vector to generate a probability that at least a portion of the second input feature vector corresponds to a first subword unit of the plurality of subword units; and
        generate speech recognition results comprising the first subword unit based at least partly on the probability.

2. The system of claim 1, wherein the executable instructions further program the one or more computer processors to at least produce a modified neural network by removing, from the neural network, parameters associated with a first side task output layer and parameters associated with a second side task output layer, wherein the parameters associated with first side task output layer comprise weights applied to data derived from the input feature vector to generate the speech prediction feature vector, and wherein the parameters associated with the second side task output layer comprise weights applied to data derived from the input feature vector to generate the interference prediction feature vector.

3. The system of claim 1, wherein the weighted sum of loss functions comprises a sum of (i) a product of a first weighting factor and a value of the first side task loss function and (ii) a product of a second weighting factor and a value of the second side task loss function.

4. The system of claim 3, wherein the executable instructions further program the one or more computer processors to at least:
  generate a plurality of trained neural networks, the plurality of trained neural networks including the neural network, wherein each trained neural network of the plurality of trained neural networks is generated using a different set of weighting factors, and wherein a set of weighting factors with which the neural network is generated comprises the first weighting factor and the second weighting factor;
  test the plurality of trained neural networks by generating, using a same set of training data for each of the plurality of trained neural networks, a corresponding set of outputs; and
  determine, using (i) a set of expected outputs from the same set of training data and (ii) the corresponding set of outputs for each of the plurality of trained neural networks, that the neural network is the most accurate of the plurality of trained neural networks.

5. A computer-implemented method comprising:
  as performed by one or more computing devices configured with specific computer-executable instructions,
    obtaining an input feature vector comprising information regarding acoustic features of an audio signal, the audio signal representing audio of both speech and acoustic interference;
    processing, using a first subset of hidden layers of a neural network, the input feature vector to produce:
      first hidden layer data comprising a representation of a speech portion of the audio signal; and
      second hidden layer data comprising a representation of an interference portion of the audio signal, wherein the second hidden layer data is separate from the first hidden layer data;
    processing, using a second subset of hidden layers of the neural network, the first hidden layer data and the second hidden layer data to generate:
      a first probability that at least a portion of the input feature vector corresponds to a first subword unit of a plurality of subword units; and
      a second probability that at least the portion of the input feature vector corresponds to a second subword unit of the plurality of subword units; and
    generating speech recognition results comprising the first subword unit based at least partly on the first probability and the second probability.

6. The computer-implemented method of claim 5, wherein the first probability that at least the portion of the input feature vector corresponds to the first subword unit is a probability that the input feature vector comprises features determined using an audio signal portion comprising audio of the first subword unit.

7. The computer-implemented method of claim 5, wherein the speech portion corresponds to a prediction of a portion of the audio signal, the portion including data regarding the speech and excluding data regarding the acoustic interference.

8. The computer-implemented method of claim 5, wherein the interference portion corresponds to a prediction of a portion of the audio signal, the portion including data regarding the acoustic interference and excluding data regarding the speech.

9. The computer-implemented method of claim 5, wherein the first subset of hidden layers comprises a first plurality of weights, wherein processing the input feature vector using a first subset of hidden layers comprises applying the first plurality of weights to the input feature vector, wherein the second subset of hidden layers comprises a second plurality of weights, and wherein processing the first hidden layer data and second hidden layer data using the second subset of hidden layers comprises applying the second plurality of weights to the first hidden layer data and the second hidden layer data.

10. The computer-implemented method of claim 5, wherein the neural network further comprises:
  a first side task output layer comprising a first plurality of parameters, wherein the first side task output layer produces a speech prediction feature vector based at least partly on applying the first plurality of parameters to the first hidden layer data or to data derived from the first hidden layer data; and
  and a second side task output layer comprising a second plurality of parameters, wherein the second side task output layer produces an interference prediction feature vector based at least partly on applying the second plurality of parameters to the second hidden layer data or to data derived from the second hidden layer data.

11. The computer-implemented method of claim 10, further comprising computing a gradient of a weighted sum of loss functions,
  wherein the weighted sum of loss functions comprises a sum of a value of a main loss function, a value of a first side task loss function, and a value of a second side task loss function,
  wherein the main loss function represents a measure of error of the probability that the input feature vector corresponds to the particular subword unit,
  wherein the first side task loss function represents a measure of error of the speech prediction feature vector, and
  wherein the second side task loss function represents a measure of error of the interference prediction feature vector.

12. The computer-implemented method of claim 11, further comprising modifying a value of a parameter of the neural network by an amount indicated by the gradient, wherein the gradient indicates a degree to which the weighted sum of loss functions changes with respect to a change in the parameter, and wherein the value of the parameter, when modified by the amount indicated by the gradient, is associated with a reduced value of the weighted sum of loss functions.

13. The computer-implemented method of claim 10, further comprising producing a modified neural network by removing, from the neural network, parameters associated with the first side task output layer and parameters associated with the second side task output layer, wherein the parameters associated with first side task output layer comprise weights applied to the first hidden layer data, and wherein the parameters associated with the second side task output layer comprise weights applied to the second hidden layer data.

14. The computer-implemented method of claim 5, wherein the processing the input feature vector comprises computing a first plurality of values of the first hidden layer data using (1) a first plurality of weights associated with a layer of the first subset of hidden layers, and (2) at least a first subset of values derived from the input feature vector, wherein the representation of the speech portion of the audio signal is based at least partly on the first plurality of values.

15. The computer-implemented method of claim 14, wherein the processing the input feature vector further comprises computing a second plurality of values of the second hidden layer data using (1) a second plurality of weights associated with a layer of the first subset of hidden layers, and (2) at least a second subset of values derived from the input feature vector, wherein the representation of the interference portion of the audio signal is based at least partly on the second plurality of values.

16. The computer-implemented method of claim 5, further comprising generating the input feature vector using data representing energy measurements for a plurality of different frequencies of the audio signal, wherein the input feature vector does not comprise data regarding the speech portion of the audio signal substantially isolated from the interference portion of the audio signal.

17. One or more non-transitory computer readable media comprising executable code that, when executed, cause one or more computing devices to perform a process comprising:
  obtaining an input feature vector comprising information regarding acoustic features of an audio signal, the audio signal representing audio of both speech and acoustic interference;
  processing, using a first subset of hidden layers of a neural network, the input feature vector to produce:
    first hidden layer data comprising a representation of a speech portion of the audio signal; and
    second hidden layer data comprising a representation of an interference portion of the audio signal, wherein the second hidden layer data is separate from the first hidden layer data;
  processing, using a second subset of hidden layers of the neural network, the first hidden layer data and the second hidden layer data to generate:
    a first probability that at least a portion of the input feature vector corresponds to a first subword unit of a plurality of subword units; and
    a second probability that at least the portion of the input feature vector corresponds to a second subword unit of the plurality of subword units; and
  generating speech recognition results comprising the first subword unit based at least partly on the first probability and the second probability.

18. The one or more non-transitory computer readable media of claim 17, wherein the neural network further comprises:
  a first side task output layer comprising a first plurality of parameters, wherein the first side task output layer produces a speech prediction feature vector based at least partly on applying the first plurality of parameters to the first hidden layer data or to data derived from the first hidden layer data; and
  and a second side task output layer comprising a second plurality of parameters, wherein the second side task output layer produces an interference prediction feature vector based at least partly on applying the second plurality of parameters to the second hidden layer data or to data derived from the second hidden layer data.

19. The one or more non-transitory computer readable media of claim 18, the process further comprising computing a gradient of a weighted sum of loss functions,
  wherein the weighted sum of loss functions comprises a sum of a value of a main loss function, a value of a first side task loss function, and a value of a second side task loss function,
  wherein the main loss function represents a measure of error of the probability that the input feature vector corresponds to the particular subword unit,
  wherein the first side task loss function represents a measure of error of the speech prediction feature vector, and
  wherein the second side task loss function represents a measure of error of the interference prediction feature vector.

20. The one or more non-transitory computer readable media of claim 19, the process further comprising modifying a value of a parameter of the neural network by an amount indicated by the gradient, wherein the gradient indicates a degree to which the weighted sum of loss functions changes with respect to a change in the parameter, and wherein the value of the parameter, when modified by the amount indicated by the gradient, is associated with a reduced value of the weighted sum of loss functions.

* * * * *

UNITED STATES PATENT AND TRADEMARK OFFICE
CERTIFICATE OF CORRECTION

PATENT NO. : 10,147,442 B1
APPLICATION NO. : 14/869803
DATED : December 4, 2018
INVENTOR(S) : Panchapagesan et al.

Page 1 of 1

It is certified that error appears in the above-identified patent and that said Letters Patent is hereby corrected as shown below:

In the Claims

Column 20, Line 25, in Claim 10, change "and a" to --a--.

Column 22, Line 14, in Claim 18, change "and a" to --a--.

Signed and Sealed this
Twenty-eighth Day of April, 2020

Andrei Iancu
*Director of the United States Patent and Trademark Office*